(12) United States Patent
Lim et al.

(10) Patent No.: US 10,488,927 B2
(45) Date of Patent: Nov. 26, 2019

(54) DISPLAY DEVICE AND METHOD OF DRIVING THE SAME

(71) Applicant: LG Display Co., Ltd., Seoul (KR)

(72) Inventors: MyungJin Lim, Goyang-si (KR); CheolSe Kim, Daegu (KR); Yong-Su Ham, Seoul (KR); Taeheon Kim, Seoul (KR); YongWoo Lee, Goyang-si (KR); YuSeon Kho, Seoul (KR); Seulgi Choi, Incheon (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 15/391,077

(22) Filed: Dec. 27, 2016

(65) Prior Publication Data

US 2017/0192508 A1 Jul. 6, 2017

(30) Foreign Application Priority Data

Dec. 30, 2015 (KR) .................. 10-2015-0189648

(51) Int. Cl.
*G06F 3/01* (2006.01)
*G06F 3/041* (2006.01)
*G06F 3/044* (2006.01)

(52) U.S. Cl.
CPC .............. *G06F 3/016* (2013.01); *G06F 3/044* (2013.01); *G06F 3/0412* (2013.01); *G06F 3/0416* (2013.01); *G06F 2203/04112* (2013.01)

(58) Field of Classification Search
CPC ........ G06F 3/016; G06F 3/0412; G06F 3/044; G06F 3/0416; G06F 2203/04112
See application file for complete search history.

(56) References Cited

U.S. PATENT DOCUMENTS

| 2007/0152982 | A1* | 7/2007 | Kim | G06F 3/016 345/173 |
| 2010/0321330 | A1* | 12/2010 | Lim | G06F 1/1626 345/174 |
| 2012/0306790 | A1* | 12/2012 | Kyung | G06F 3/016 345/173 |
| 2013/0057511 | A1* | 3/2013 | Shepelev | G06F 3/044 345/174 |
| 2013/0063394 | A1 | 3/2013 | Wakuda | |
| 2013/0100038 | A1* | 4/2013 | Yilmaz | G06F 3/044 345/173 |

(Continued)

FOREIGN PATENT DOCUMENTS

| CN | 102236463 A | 11/2011 |
| CN | 104714688 A | 6/2015 |

(Continued)

*Primary Examiner* — Ibrahim A Khan
(74) *Attorney, Agent, or Firm* — Dentons US LLP

(57) ABSTRACT

Provided are a display device and a method of driving the same. The display device includes: a touch sensitive element having an electroactive layer and a plurality of electrodes disposed on at least one of a top surface and a bottom surface of the electroactive layer; a display panel disposed under the touch sensitive element; and a touch sensor disposed under the touch sensitive element and having a plurality of touch electrodes, and each of the plurality of electrodes of the touch sensitive element overlaps with one touch electrode from among the plurality of touch electrodes in a one to one correspondence.

13 Claims, 12 Drawing Sheets

(56) References Cited

U.S. PATENT DOCUMENTS

| | | | |
|---|---|---|---|
| 2013/0106441 A1* | 5/2013 | Yilmaz | G06F 3/0414 324/658 |
| 2013/0106758 A1 | 5/2013 | Radivojevic et al. | |
| 2013/0181942 A1* | 7/2013 | Bulea | G06F 3/044 345/174 |
| 2014/0015777 A1* | 1/2014 | Park | G06F 3/044 345/173 |
| 2014/0062910 A1* | 3/2014 | Yeo | G06F 3/0488 345/173 |
| 2014/0071067 A1* | 3/2014 | Hong | G06F 3/041 345/173 |
| 2014/0210784 A1* | 7/2014 | Gourevitch | H03K 17/962 345/174 |
| 2014/0320199 A1* | 10/2014 | Trend | G06F 3/044 327/517 |
| 2014/0333573 A1 | 11/2014 | Hong et al. | |
| 2014/0354301 A1* | 12/2014 | Trend | G06F 3/044 324/658 |
| 2015/0116231 A1* | 4/2015 | Kim | G06F 3/016 345/173 |
| 2015/0138104 A1* | 5/2015 | Sugita | G06F 3/016 345/173 |
| 2015/0169118 A1 | 6/2015 | Lee et al. | |
| 2015/0185928 A1 | 7/2015 | Son et al. | |
| 2015/0316986 A1 | 11/2015 | Xue | |
| 2015/0378478 A1* | 12/2015 | Sugita | G06F 3/0416 345/174 |
| 2016/0004309 A1* | 1/2016 | Modarres | G06F 3/016 345/173 |
| 2016/0041636 A1 | 2/2016 | Yun et al. | |
| 2016/0313793 A1* | 10/2016 | Hong | G06F 3/016 |
| 2017/0285810 A1* | 10/2017 | Krah | G06F 3/044 |

FOREIGN PATENT DOCUMENTS

| | | |
|---|---|---|
| KR | 10-2013-0089211 A | 8/2013 |
| WO | 2013032302 A2 | 3/2013 |
| WO | 2013173624 A2 | 11/2013 |

* cited by examiner

| 298 | 316 | 316 | 329 | 279 |
|-----|-----|-----|-----|-----|
| 378 | 426 | 458 | 443 | 318 |
| 349 | 440 | 471 | 478 | 327 |
| 338 | 452 | 456 | 482 | 326 |
| 301 | 327 | 310 | 322 | 290 |

FIG. 7A

| 284 | 286 | 295 | 286 | 262 |
|-----|-----|-----|-----|-----|
| 258 | 290 | 342 | 300 | 275 |
| 267 | 326 | 526 | 380 | 284 |
| 273 | 317 | 334 | 320 | 276 |
| 290 | 292 | 284 | 281 | 269 |

FIG. 7B

DISPLAY DEVICE AND METHOD OF DRIVING THE SAME

CROSS-REFERENCE TO RELATED APPLICATIONS

This application claims priority from Korean Patent Application No. 10-2015-0189648 filed on Dec. 30, 2016, the disclosure of which is incorporated by reference in its entirety as if fully set forth herein.

BACKGROUND

Technical Field

The present disclosure relates to a display device and a method of driving the same, including a display device in which a touch sensor is embedded in a display panel and a touch sensitive element is included to provide touch recognition and tactile feedback to a user in response to a touch input, and a method of driving the same.

Description of the Related Art

Touch sensors are devices that detect a touch input of a user, such as a screen touch for a display device or a gesture. These are widely used in touch sensor display devices in public facilities in large-sized display devices, such as a smart TV, and the like, and in portable display devices, such as smart phones, tablet PCs, and the like.

Touch sensors may be classified based on the position at which the touch sensor is disposed in the display device. For example, the touch sensors may be classified as: in-cell type touch sensors, in which the touch sensor is embedded in a display panel; an on-cell type touch sensor, in which the touch sensor is formed on the top of the display panel; an add-on type touch sensor in which a separately manufactured touch sensor is separately disposed on the top of the display device; and a hybrid type touch sensor, in which the various types of touch sensors are combined. Among the various types of the touch sensors, the add-on type increases the thickness of the display device and the corresponding manufacturing cost, because a separate touch sensor needs to be attached to the top of the display device and thus, this type of touch sensor may not be desirable. Additionally, it is difficult to attach the add-on type touch sensor to a flexible display device. Therefore, in recent years, there has been an increasing interest in integrating the touch sensor in the display device by using an in-cell type touch sensor, or the add-on type touch sensor has been continuously made in order to provide a light and thin display device.

In recent years, there has been an increasing interest in haptic devices that not only detect the touch input of the user but also transfer a tactile feedback, which may be felt with a finger or a stylus pen, to notify the user that the touch input of the user has been pursued.

Among the various haptic devices, a haptic device adopting an eccentric rotating mass (ERM), a linear resonant actuator (LRA), a piezo ceramic actuator, and the like, have been used. However, haptic devices are generally made of an opaque material, they vibrate the entirety of the display device rather than a specific part, they cannot provide different vibrations, and they may be easily broken by external impact due to low durability.

Accordingly, there is an increased interest in developing haptic devices which solve the above discussed problems associated with display devices having touch sensors integrated therein.

SUMMARY

Exemplary objectives of the present disclosure is to provide a display device and a method of driving the same, which can transfer touch sensing and provide tactile feedback, thereby solving problems of misrecognition of a touch input due to the generation of noise in a touch sensitive element.

The present disclosure is not limited to the aforementioned objectives, and additional objectives will be apparent to a person having ordinary skill in the art from the following description.

An exemplary embodiment of the present disclosure is a display device comprising: a touch sensitive element having an electroactive layer and a plurality of electrodes disposed on at least one of a top surface and a bottom surface of the electroactive layer; a display panel disposed under the touch sensitive element; and a touch sensor disposed under the touch sensitive element and having a plurality of touch electrodes, wherein each of the plurality of electrodes of the touch sensitive element overlaps with one touch electrode of the plurality of touch electrodes in a one to one correspondence.

In another exemplary embodiment, an area of each of the plurality of electrodes of the touch sensitive element is equal to or smaller than an area of the corresponding one touch electrode of the plurality of touch electrodes.

In another exemplary embodiment, each of the plurality of touch electrodes overlaps with two or more electrodes of the plurality of electrodes of the touch sensitive element.

In another exemplary embodiment, the touch sensitive element includes a plurality of cells in which the plurality of electrodes are disposed, and each of the plurality of cells overlaps with one touch electrode of the plurality of touch electrodes in a one to one correspondence.

In another exemplary embodiment, each of the plurality of cells includes a driving circuit implemented by an active matrix method.

In another exemplary embodiment, the touch sensor is an in-cell type touch sensor integrated in the display panel, and the plurality of touch electrodes are a plurality of common electrodes driving the display panel.

In another exemplary embodiment, the display device is time-division driven into an image display period and a touch sensing period, and during the image display period, a common voltage is applied to the plurality of touch electrodes and a driving voltage is applied to the plurality of electrodes of the touch sensitive element, and during the touch sensing period, the plurality of electrodes of the touch sensitive element are floating.

In another exemplary embodiment, the touch sensor is an on-cell type touch sensor in which the plurality of touch electrodes is disposed on a top surface of the display panel.

In another exemplary embodiment, the display device is time-division driven into a touch sensing period and a touch sensitive element driving period, and the plurality of electrodes of the touch sensitive element are floating during the touch sensing period.

In another exemplary embodiment, the electroactive layer comprises an electroactive polymer, and the plurality of electrodes of the touch sensitive element comprises a transparent conductive material.

In another exemplary embodiment, the touch sensitive element includes a plurality of cells, and two touch electrodes of the plurality of electrodes having a comb shape and two electrodes of the plurality of electrodes having a shape corresponding to the shape of the two touch electrodes are disposed n each of the plurality of cells.

Another exemplary embodiment of the present disclosure is a display device comprising: a display panel; a touch sensor having a plurality of touch electrodes disposed in the display panel or on a top surface of the display panel; and a touch sensitive element disposed on the display panel and the touch sensor, wherein the touch sensitive element includes an electroactive layer, and a plurality of electrodes disposed on at least one surface of the electroactive layer and wherein each of the plurality of electrodes corresponds with one touch electrode among the plurality of touch electrodes, respectively, in a one to one correspondence.

In another exemplary embodiment, the display panel is a liquid crystal display panel, and the plurality of touch electrodes are common electrodes of the liquid crystal display panel.

In another exemplary embodiment, the display panel is an organic light emitting display panel, and the plurality of touch electrodes is disposed on a top surface of an upper substrate of the organic light emitting display panel.

In another exemplary embodiment, the plurality of electrodes of the touch sensitive element includes a plurality of first electrodes disposed on a top surface of the electroactive layer and a plurality of second electrodes disposed on a bottom surface of the electroactive layer, and each of the first electrodes and each of the second electrodes overlapping with each other are disposed to overlap with the same one touch electrode of the plurality of touch electrodes in a one to one correspondence.

In another exemplary embodiment, the plurality of electrodes of the touch sensitive element includes a plurality of first electrodes and a plurality of second electrodes disposed on the same surface of the electroactive layer, each of the first electrodes and each of the second electrodes are spaced apart from each other, and each of the first electrodes and each of the second electrodes overlapping with each other are disposed to overlap with the same one touch electrode of the plurality of touch electrodes in a one to one correspondence.

Another exemplary embodiment of the present disclosure is a method of driving a display device, the method comprising: applying a common voltage to a plurality of common electrodes of a display panel in which a touch panel is integrated and applying a driving voltage to a plurality of electrodes disposed on at least one surface of an electroactive layer of a touch sensitive element positioned on the display panel, during an image display period; and applying a touch signal to the plurality of common electrodes and floating the plurality of electrodes of the touch sensitive element, during a touch sensing period, wherein each of the plurality of electrodes of the touch sensitive element overlaps with one common electrode of the plurality of common electrodes in a one to one correspondence.

Other exemplary embodiments are included in the following description and accompanying drawings.

As a result of these exemplary embodiments, deterioration of the transmittance of a touch sensitive element can be minimized by generating a tactile feedback of various vibrations to a user via a touch sensitive element is applied to a display device. A stronger tactile feedback can be transferred to the user at low drive voltage and generation of touch noise by the touch sensitive element can be minimized, and a light and thin display device can be provided.

The effects of the present disclosure are not limited to the aforementioned effects, and various other effects which would be apparent to a skilled artisan based on the description herein, are included in the present specification.

BRIEF DESCRIPTION OF THE DRAWINGS

The above and other aspects, features and other advantages of the present disclosure will be more clearly understood from the following detailed description in conjunction with the accompanying drawings, in which:

FIGS. 7A and 7B are schematic views comparing touch signal values measured in corresponding FIGS. 6B and 6C.

DETAILED DESCRIPTION OF THE EMBODIMENT

Figure 1:
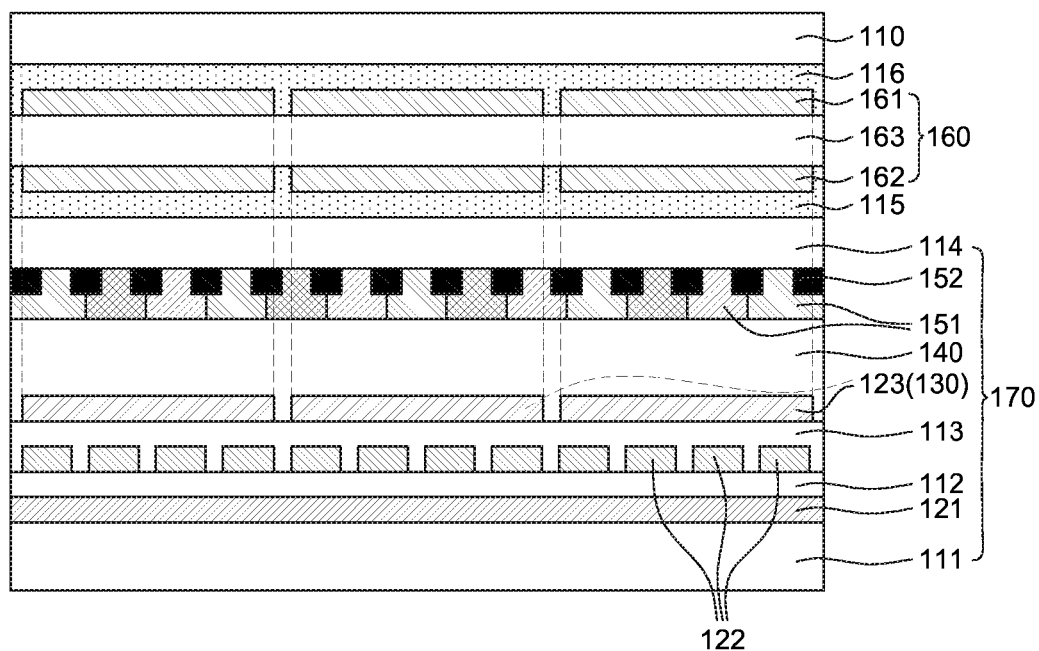
FIG. 1 is a schematic cross-sectional view of a display device according to a first exemplary embodiment of the present disclosure.

Advantages and features of the present disclosure, and methods for accomplishing the same, will be more clearly understood from the exemplary embodiments described under with reference to the accompanying drawings. However, the present disclosure is not limited to the following exemplary embodiments, and may be implemented in various different forms. The exemplary embodiments are provided only to complete disclosure of the present disclosure and to fully provide a person having ordinary skill in the art to which the present disclosure pertains with the category of the disclosure. The present disclosure is defined by the appended claims and any combinations thereof.

Shapes, sizes, ratios, angles, numbers, and the like, illustrated in the accompanying drawings for describing the exemplary embodiments of the present disclosure are merely exemplary, and the present disclosure is not limited thereto. Like reference numerals generally denote like elements throughout the present specification. Further, detailed explanations of known related technologies may be omitted in the following description to avoid unnecessarily obscuring the subject matter of the present disclosure. Terms such as "including," "having," and "consisting of" used herein are generally intended to allow other components to be added unless the terms are used with the term "only". Any references to singular may include the plural unless expressly stated otherwise.

Components are interpreted to include an ordinary error range even if not expressly stated.

When the positional relation between two parts is described using terms such as "on", "above", "under", and "next", one or more parts may be positioned between the two parts unless the terms are used in conjunction with the term "immediately" or "directly".

When an element or layer is referred to as being "on" another element or layer, it may be directly on the other element or layer, or intervening elements or layers may be present, unless the terms are used in conjunction with the term "immediately" or "directly".

Although the terms "first", "second", and the like may be used for describing various components, these components are not confined by these terms. These terms are merely used for distinguishing one component from the other components. Therefore, a first component may be a second component in a technical concept of the present disclosure.

The size and thickness of each component illustrated in the drawings are represented for convenience of explanation, and these features are not necessarily to scale.

The features of various embodiments of the present disclosure can be partially or entirely bonded, to or combined with, each other and can be interlocked and operated in various technical ways, and the embodiments can be carried out independently of or in association with each other.

Hereinafter, various exemplary embodiments of the present disclosure will be described in detail with reference to the accompanying drawings.

FIG. 1 is a schematic cross-sectional view of a display device according to a first exemplary embodiment of the present disclosure. As illustrated in FIG. 1, the display device 100 includes a display panel 170, a touch sensor having a touch electrode 130, and a touch sensitive element 160.

The display panel 170 includes a first substrate 111, a gate line 121, a first insulating layer 112, a plurality of data lines 122, a second insulating layer 113, a pixel electrode (not shown), a common electrode 123, a liquid crystal layer 140, a color filter 151, a black matrix 152, and a second substrate 114. Although not illustrated in FIG. 1, the display panel 170 may further include a backlight unit that supplies light to the liquid crystal layer 140 and is disposed under the first substrate 111. As illustrated in FIG. 1, that the color filter 151 and the black matrix 152 are disposed on the second substrate 114, but the present disclosure is not limited thereto and the color filter 151 and the black matrix 152 may be disposed on the first substrate 111. As illustrated in FIG. 1, that the display panel 170 is a liquid crystal display panel, but a type of the display panel 170 is not limited thereto. For example, the display panel 170 may be selected from a variety of display panels, including an organic light emitting display panel, and the like. A case where the display panel 170 is the organic light emitting display panel will be described with reference to FIG. 8.

The first substrate 111 supports various components of the display panel 170, and may be made of glass or plastic having flexibility.

Various lines or drive elements for driving the display panel 170 are disposed on the first substrate 111. Referring to FIG. 1, a plurality of gate lines 121 are disposed on the first substrate 111 and the first insulating layer 112, for protecting the gate line 121 and insulating the gate line from other components, is disposed on the plurality of gate line 121. A plurality of data lines 122 is disposed on the first insulating layer 112. The plurality of data lines 122 is disposed to cross the plurality of gate lines 121 and a pixel region is defined by each of the data lines 122 and are gate lines 121. Although not illustrated in FIG. 1, a common voltage line for applying common voltage to the common electrode 123 is further disposed, for example, to overlap with the plurality of data lines 122, thereby reducing a region occupied by the various lines in the display panel 170. Further, although not illustrated in FIG. 1, a thin film transistor (TFT) may be disposed on the first substrate 111, which is configured to be electrically connected with the plurality of gate lines 121, and to be turned on/off by a signal from the gate lines 121. The TFT transfer of the signal from the data lines 122 to a pixel electrode. The layout and configuration for the various lines and driving elements, as described above are exemplary and the present disclosure is not limited thereto.

The second insulating layer 113 is disposed on the data lines 122, layer 113 planarizes the gate lines 121, the data lines 122, the common voltage line, and the top of the thin film transistor. The second insulating layer 113 may be made of an organic insulating material, for example, an acrylic-based resin.

The pixel electrode and the common electrode 123 are disposed on the second insulating layer 113. The common electrode 123 is configured to be electrically connected with the common voltage line to receive the common voltage and the pixel electrode is configured to be electrically connected with the thin film transistor to receive data voltage. The pixel electrode is not illustrated in FIG. 1 for ease of description, but the pixel electrode may be formed at different positions according to a method of adjusting an array of the liquid crystal layer 140 of the display panel 170. For example, when the display panel 170 is an in-plane switching (IPS) mode liquid crystal display panel, the pixel electrode and the common electrode 123 may be alternately arrayed in parallel on the same plane to generate a horizontal electric field between the pixel electrode and the common electrode 123. Alternatively, when the display panel 170 is a fringe field switching (FFS) mode liquid crystal display panel, the pixel electrode and the common electrode 123 may be spaced apart from each other with an insulating layer interposed therebetween to generate a vertical electric field between the pixel electrode and the common electrode 123.

The liquid crystal layer 140 is disposed on the common electrode 123. An array of liquid crystals of the liquid crystal layer 140 is changed by the electric field generated as the data voltage and the common voltage are provided to the pixel electrode and common electrode 123, respectively. The display panel 170 may display an image by adjusting the transmittance of light irradiated by the backlight unit based on the orientation of the liquid crystals, adjusted by the aforementioned method.

The second substrate 114 is disposed on the liquid crystal layer 140 and the color filter 151 and the black matrix 152 are disposed between the second substrate 114 and the liquid crystal layer 140. The second substrate 114 supports various components formed on the second substrate 114 like the color filter 151 and the black matrix 152. The second substrate 114 is disposed to face the first substrate 111, and may be made of a flexible glass or plastic. The color filter 151 which is used for converting light which passes through the liquid crystal layer 140 into light having a specific color may be constituted by, for example, a red color filter 151R, a green color filter 151G, and a blue color filter 151B. The color filter 151 and the black matrix 152 are disposed on the second substrate 114, as illustrated in FIG. 1, but the present disclosure is not limited thereto and the color filter 151 and the black matrix 152 may be disposed on the first substrate 111.

The touch sensor is an in-cell type touch sensor configured to be integrated with the display panel 170. That is, the touch sensor is disposed in the display panel 170. The touch sensor includes a plurality of touch electrodes 130. In this case, the plurality of touch electrodes 130 also serve as the common electrode 123, i.e., one electrode may operate as both the common electrode 123 and the touch electrode 130. Therefore, the display panel 170 is time-division driven, and an image is displayed by the electric field formed by the pixel electrode and the common electrode 123 by the common voltage (an image display signal) applied to the common electrode 123 during an image display period and a touch signal is applied to the common electrode 123, that is, the touch electrode 130 detects a touch input from a user during a touch sensing period.

In the above-described display panel 170, capacitance between the touch electrode 130 and the gate line 121, capacitance between the touch electrode 130 and the data line 122, capacitance between the touch electrode 130 and the pixel electrode, and capacitance between the touch electrodes neighboring each other are present in the in-cell type touch sensor. When the user performs the touch input by using a finger, the capacitance is generated between the touch electrode 130 and the finger of the user in addition to the aforementioned capacitance component, and the capacitance may vary in the touch electrode 130. Accordingly, when a touch signal is applied to the touch electrode 130, whether a touch occurs and the touch input position is detected by sensing the signal variation, which depends on the change in the afore-mentioned capacitance. The driving method of the display panel 170 for detecting the touch input of the user by the in-cell type touch sensor will be described in detail with reference to FIG. 3.

As further illustrated in FIG. 1, the touch sensitive element 160 is disposed on the display panel 170 and the touch sensor. The touch sensitive element 160 is bonded with the second substrate 114 of the display panel 170 through a first bonding layer 115 and bonded with a cover window 110 on the touch sensitive element 160 through a second bonding layer 116. The cover window 110 may be made of transparent glass or transparent plastic in order to protect the display device 100 from external impact, and the like. The first bonding layer 115 and the second bonding layer 116 may be made of a transparent adhesive material, for example, an optical clear adhesive (OCA) or an optical clear resin (OCR), but are not limited thereto.

The touch sensitive element 160 has an electroactive layer 163 and a plurality of electrodes 161 and 162 disposed on a top surface and a bottom surface of the electroactive layer 163. In the present disclosure, the touch sensitive element 160 is an element that may transfer a tactile feedback to the user in response to a touch by the user to the touch sensitive element 160, and the electroactive layer 163 is a layer having a shape which is transformable upon application of a voltage to transfer the generated vibrations to the user as a tactile feedback.

The electroactive layer 163 is a plate type film made of an electroactive polymer, which is a polymer material deformed by an electric stimulus. For example, the electroactive layer 163 may be made of a dielectric elastomer such as a silicon base, an urethane base, and an acryl base, a ferroelectric polymer such as polyvinylidene fluoride (PVDF), and a poly(vinylidenefluoride-co-trifluoroethylene) (P(VDF-TrFE)), or a piezo ceramic element. When the electroactive layer 163 is made of the dielectric elastomer, the dielectric elastomer contracts and expands due to electrostatic attraction (Coulombic force) generated by applying the voltage to the electroactive layer 163, thereby vibrating the touch sensitive element 160. Alternatively, when the electroactive layer 163 is made of the ferroelectric polymer, an orientation direction of a dipole in the electroactive layer 163 is changed by applying the voltage to the electroactive layer 163, thereby vibrating the touch sensitive element 160.

A plurality of first electrodes 161 are disposed on the top surface of the electroactive layer 163 and a plurality of second electrodes 162 are disposed on the bottom surface of the electroactive layer 163.

The plurality of first electrodes 161 and the plurality of second electrodes 162 are made of a conductive material. Further, in order to secure the transmittance of the touch sensitive element 160, the first eleectrodes 161 and the second electrodes 162 may be made of a transparent conductive material, for example, indium tin oxide (ITO), PEDOT:PSS, and silver-nanowire (AgNW). Further, the first electrodes 161 and the second electrodes 162 may be a metal mesh in which a metallic material is disposed in a mesh pattern, such that the first electrode 161 and the second electrode 162 may substantially serve as a transparent electrode. However, the component materials of the first electrode 161 and the second electrode 162 are not limited to the aforementioned examples, and various other transparent conductive materials may be used. The first electrode 161 and the second electrode 162 may be made of the same material or different materials.

The first electrodes 161 and the second electrodes 162 may be formed by various methods, including sputtering, printing, slit coating, and the like.

As described above, the touch sensitive element 160 made of the electroactive polymer may transfer a tactile feedback to the user via vibrations of the electroactive layer 163 generated by applying a voltage to the first electrode 161 and the second electrode 162 disposed on the top surface and the bottom surface of the electroactive layer 163, respectively. Further the touch sensitive element 160 may have high transmittance because the touch sensitive element may be made of transparent materials, and as a result, the touch sensitive element 160 may be applied to a front surface of the display device 100.

Each of the plurality of electrodes 161 and 162 of the touch sensitive element 160 overlaps only with one touch electrode 130 among a plurality of touch electrodes 130. That is, one electrode of the plurality of electrodes 161 and 162 of the touch sensitive element 160 overlaps only with one touch electrode 130. Relationships between the plurality of touch electrodes 130 and the plurality of electrodes 161 and 162 of the touch sensitive element 160 will be described in more detail with reference to FIG. 2.

Figure 2:
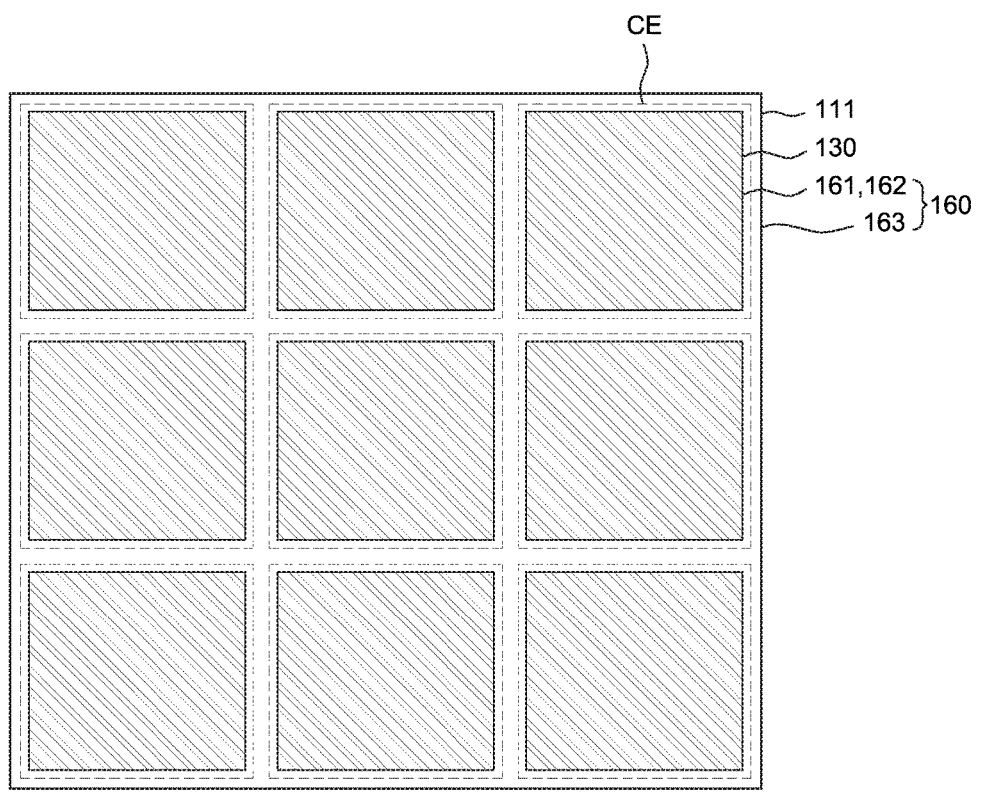
FIG. 2 is a schematic plan view of a display device according to a firstexemplary embodiment of the present disclosure.

FIG. 2 is a schematic plan view of a display device according to a first exemplary embodiment of the present disclosure. In FIG. 2, only the touch sensitive element 160, the touch electrode 130, and the first substrate 111 among various components of the display device 100 and a state in which only the touch sensitive element 160, the touch electrode 130, and the first substrate 111 are viewed from the top of the touch sensitive element 160 are illustrated for ease of description. Therefore, a component disposed thereunder in the same area is represented only by a reference numeral.

As illustrated in FIG. 2, the touch sensitive element 160 includes a plurality of cells CE in which the plurality of electrodes 161 and 162 are disposed in each of the plurality of cells CE, such that the first electrode 161 is disposed on the top surface of the electroactive layer 163 and the second electrode 162 is disposed on the bottom surface of the electroactive layer 163. The first electrode 161 and the second electrode 162 disposed in one cell CE have the same size. That is, one surface of the first electrode 161 and one surface of the second electrode 162, which face each other, have the same area. Herein, the cell CE is a minimum unit region that may transfer the tactile feedback to the user and multiple cells CE may independently transfer the tactile feedback to the user. As the touch sensitive element 160 transfers the tactile feedback for the touch input of the user, the cell CE as the minimum unit region may be determined by considering an area in which the touch input of the user occurs. In this case, since the area in which the touch input of the user occurs is determined according to the size of a finger of an average person, the area of the cell CE of the electroactive layer 163 may also be determined based on the size of a finger of an average person. However, the area of the cell CE of the electroactive layer 163 described above is exemplary, and the area of the cell CE of the electroactive layer 163 is not limited to the aforementioned example.

As illustrated in FIGS. 1 and 2, the first electrode 161 and the second electrode 162 which are disposed in one cell CE of the touch sensitive element 160 only overlap with the touch electrode 130 in that specific cell CE. In other words, the first electrode 161 and the second electrode 162 disposed in a specific cell CE of the touch sensitive element 160 do not overlap with the touch electrode 130 of an adjacent cell.

As further illustrated in FIGS. 1 and 2, the size of each of the plurality of electrodes 161 and 162 is the same as the size of the corresponding touch electrode 130 among the plurality of touch electrodes 130. For example, one surface of the first electrode 161 and one surface of the second electrode 162 facing the touch electrodes 130 have the same area as one surface of the touch electrode 130 in the cell CE facing the first electrode 161 and the second electrode 162. As a result, each of the first electrode 161 and the second electrode 162 disposed in one cell CE may correspond to the touch electrode 130 one to one.

Each of the plurality of cells CE of the touch sensitive element 160 may include a drive circuit implemented by an active matrix method. When the touch sensitive element 160 is implemented by a passive matrix method, the electrodes 161 and 162 may have a bar shape. In this case, each of the electrodes 161 and 162 of the touch sensitive element 160 needs to be disposed to overlap with the plurality of touch electrodes 130. Accordingly, each of the plurality of cells CE of the touch sensitive element 160 of the display device 100 according to the first exemplary embodiment of the present disclosure may be driven by the active matrix method. For example, the thin film transistor may be disposed in each cell as the drive circuit and the thin film transistor may apply a touch sensitive element drive signal to the first electrode 161 and the second electrode 162 disposed in each cell CE.

When the first electrode 161 or the second electrode 162 of the touch sensitive element 160 overlaps throughout the plurality of touch electrodes 130, the touch input of the user may not be accurately detected. For example, when the first electrode 161 or the second electrode 162 of the touch sensitive element 160 overlap with two touch electrodes 130 that are adjacent to each other, and the user touches a position corresponding to one touch electrode 130 of two touch electrodes 130, capacitances between both touch electrodes 130 and the first electrode 161 or the second electrode 162 may be changed because of the aforementioned overlap. That is, only when the capacitance for a single touch electrode 130 touched by the user is changed, the touch input of the user can be accurately detected.

In the display device 100 according to the first exemplary embodiment of the present disclosure, each of the plurality of electrodes 161 and 162 of the touch sensitive element 160 overlaps only with one touch electrode 130 among the plurality of touch electrodes 130. Accordingly, when the user touches the position corresponding to the one touch electrode 130, only the capacitances between the electrodes 161 and 162 which overlap with the corresponding touch electrode 130 there is no change in the capacitance of another touch electrode 130 adjacent to the corresponding touch electrode 130. Alternatively, even if the capacitance of another adjacent touch electrode 130 is changed, the change is negligible. Accordingly, in the display device 100, even when the touch sensor is disposed under the touch sensitive element 160, the touch input of the user may be accurately detected and the tactile feedback obtained through the touch sensitive element 160 may be transferred to the user.

Hereinafter, a method of driving the display device 100 having the electrode layout structure described above will be described with reference to FIG. 3 together.

Figure 3:
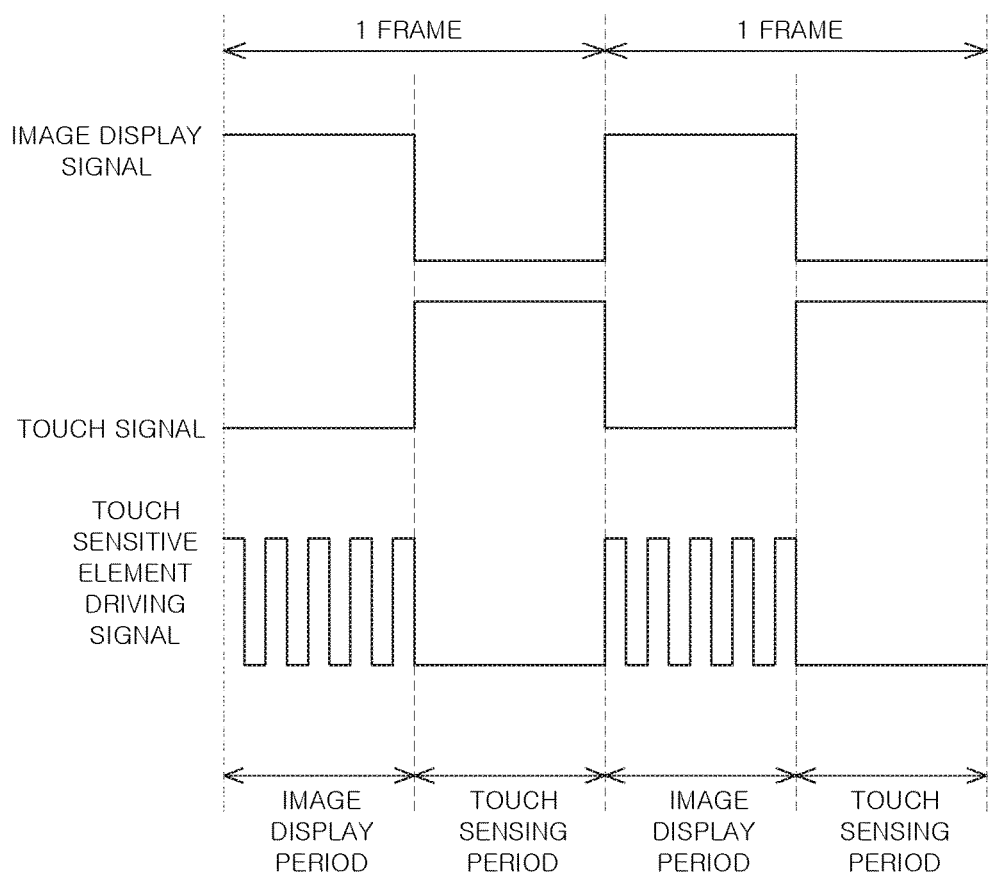
FIG. 3 is a schematic waveform diagram of an input signal for a method of driving a display device according to a first exemplary embodiment of the present disclosure.

FIG. 3 is a schematic waveform diagram of an input signal for a method of driving a display device according to an exemplary embodiment of the present disclosure. FIG. 3 schematically illustrates waveforms for the image display signal and the touch signal applied to the common electrode 123 and the touch electrode 130 and the touch sensitive element driving signals applied to the plurality of electrodes 161 and 162 of the touch sensitive element 160 in each of the image display and touch sensing periods.

In the display device 100 according to the first exemplary embodiment of the present disclosure, the in-cell type touch sensor is integrated with the display panel 170. As described above, the common electrode 123 of the display panel 170 serves as the touch electrode 130. To this end, the display device 100 is time-division driven into the image display period and the touch sensing period. For example, as illustrated in FIG. 3, during the image display period in one frame period, the image display signal for displaying the image is applied to the common electrode 123, generating an electric field between the common electrode 123 and the pixel electrode and the orientation of the liquid crystals of the liquid crystal layer 140 is changed by the electric field, thereby displaying an image may. In this case, the touch signal is not applied and touch sensing is not performed. During the touch sensing period in one frame period, the touch signal is applied to the touch electrode 130. When the touch input of the user occurs while the touch signal is applied, the capacitance of the touch electrode 130 with respect to the gate line 121, the data line 122, the pixel electrode, or the finger of the user is changed to detect whether a touch has occurred and a position thereof. Although a DC touch signal voltage is illustrated in FIG. 3, but the present disclosure is not limited thereto and an AC touch signal voltage may be applied to the common electrode 123. Further, although the image display period and the touch sensing period are illustrated in FIG. 3 as having the same length in one frame period for ease of description, the touch sensing period may be shorter than the image display period.

The display device 100 also includes a touch sensitive element 160 for transferring the tactile feedback to the user, and in-cell type touch sensor is integrated with the display panel 170. In the display device 100, the touch sensitive element 160 applies the voltage to the plurality of electrodes 161 and 162 to generate the electric field and the generated electric field is applied to the electroactive layer 163, which is transformed and vibrates to provide a tactile feedback to the user. For example, as illustrated in FIG. 1, when a vertical electric field is applied to the electroactive layer 163 disposed between the first electrode 161 and the second electrode 162, which are grounded, the electroactive layer 163 vibrates to provide a tactile feedback to the user.

Meanwhile, when the touch input of the user occurs while a driving voltage for driving the touch sensitive element 160 is applied to the first electrode 161 and the second electrode 162, the change in capacitance by the touch input of the user may be interrupted by the touch sensitive element 160. Therefore, the touch sensitive element 160 of the display device 100 is time-division driven. As illustrated in FIG. 3, during the image display period in one frame period, the common electrode 123 does not detect the touch input of the user because the image display signal for displaying the image is applied to the common electrode 123. Therefore, an AC voltage or pulse voltage is applied to the first electrode 161 of the touch sensitive element 160 and the second electrode 162 of the touch sensitive element 160 is grounded to vibrate the electroactive layer 163. Since the touch signal is applied to the touch electrode 130 during the touch sensing period in one frame period, when the touch sensitive element 160 is driven in the touch sensing period, the touch sensor may not normally detect the touch input. Therefore, during the touch sensing period, the plurality of electrodes 161 and 162 of the touch sensitive element 160 are floating, and the touch sensor may thereby accurately detect the touch input of the user.

In the display device 100, the in-cell type touch sensor in which the touch sensor is embedded in the display panel 170 is applied to provide a light and thin display device 100 by reducing the thickness of the display device 100 including the touch sensor. In detail, a separately manufactured touch sensor is not disposed on the display panel in the in-cell type touch sensor, but the touch sensor is disposed in the display panel. Thus, the display device 100 has a small thickness and can be manufactured as a lower cost. Further, in the display device 100 the touch sensor is disposed in front of the touch sensitive element 160 so as to remove a damping phenomenon in which the vibration transferred to the user is reduced. Accordingly, power consumption of the touch sensitive element 160 may also be improved because the touch sensitive element may be driven at a lower driving voltage.

However, as the display panel and the touch sensor are integrated with each other, the touch sensitive element 160 needs to be disposed above or under the display panel and the touch sensor. When the touch sensitive element is positioned under the display panel and the touch sensor, the vibrations are reduced by the display panel and the touch sensor disposed between the finger of the user and the touch sensitive element. That is, as a distance between a position which the user touches with the finger and the touch sensitive element increases, a degree of dampening of the vibrations generated by the touch sensitive element also increases. Therefore, when the touch sensitive element is disposed under the display panel and the touch sensor, vibration having a sufficient strength may be transferred to the user only by applying high driving voltage. Accordingly, it is difficult to implement the touch sensitive element having low power consumption. Therefore, in the display device 100, the touch sensitive element 160 is disposed on the display panel 170 and the touch sensor. Accordingly, stronger vibrations may be transferred to the user with lower power consumption than when the touch sensitive element 160 is disposed under the display panel 170 and the touch sensor. However, the touch sensor may malfunction due to the driving voltage applied to the touch sensitive element 160 or the touch input may not be detected because the touch sensitive element 160 made of electroactive polymers has very high driving voltage. Therefore, the touch sensitive element 160 of the display device 100 is driven only in the image display period in which the touch sensor is not driven. That is, during the touch sensing period in which the touch sensor is driven, the plurality of electrodes 161 and 162 of the touch sensitive element 160 are floating to minimize noise generated by the touch sensitive element 160. Further, as the touch sensitive element 160 is disposed on the uppermost part, a tactile feedback may be transferred to the user with low power consumption.

As illustrated in FIGS. 1 to 3, the display panel 170 is an IPS-mode liquid crystal display panel or an FFS-mode liquid crystal display panel, but is not limited thereto. Alternatively, the display panel 170 may be a twisted nematic (TN)-mode liquid crystal display panel or a vertical alignment (VA)-mode liquid crystal panel. As described above, in the case of the liquid crystal display panel displaying the image using the vertical electric field, the common electrode 123 may be disposed on the second substrate 114.

Figure 4A:
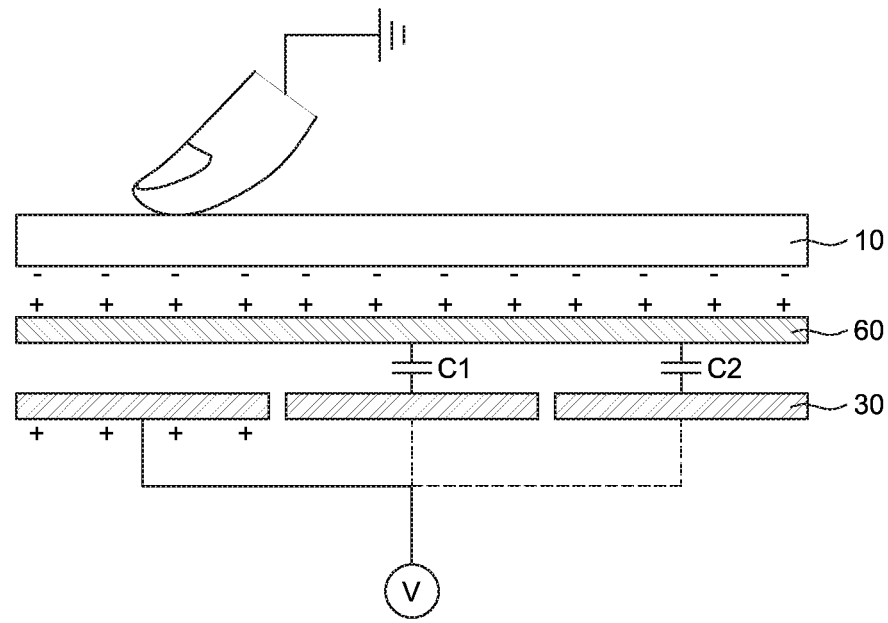
FIG. 4A is a schematic cross-sectional view illustrating a misrecognition problem associated with a touch input in a display device of a comparative example.
Figure 4B:
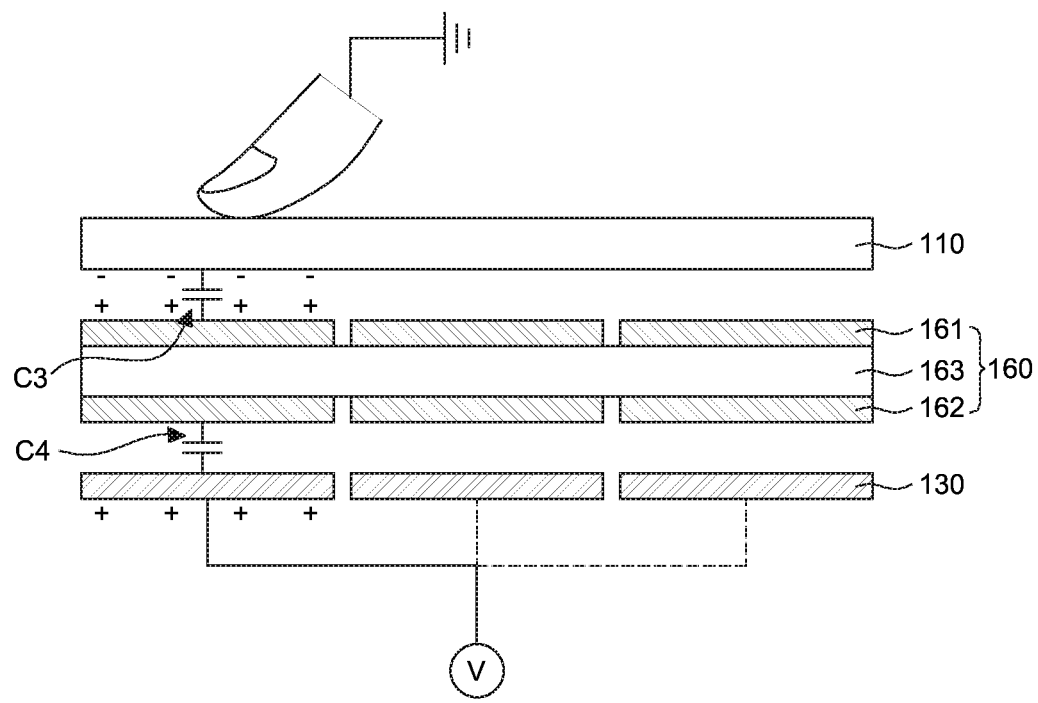
FIG. 4B is a schematic cross-sectional view illustrating an effect in a display device according to a first exemplary embodiment of the present disclosure.

FIG. 4A as a schematic cross-sectional view illustrating a problem of misrecognition for the touch input according to a comparative example, which may occur when one electrode 60 of the touch sensitive element overlaps a plurality of touch electrodes 30. FIG. 4A schematically illustrates only the cover window 10, the electrode 60 of the touch sensitive element, and the plurality of touch electrodes 30. FIG. 4B is a schematic cross-sectional view describing an effect in a display device according to the first exemplary embodiment, and schematically illustrates only the cover window 110, the touch sensitive element 160, and the plurality of touch electrodes of the display device 100 for ease of description.

When electrode 60 of the touch sensitive element overlaps the plurality of touch electrodes 30, as illustrated in the comparative example of FIG. 4A, the touch input may be misrecognized. Particularly, when a touch signal is applied only to the left touch electrode 30 from among the plurality of touch electrodes 30 by a voltage source V, all of the electrodes 60 are charged with an electric charge having a polarity because the electrodes 60 are floating. Therefore, when the user applies a touch input to the cover window 110, electric charges having an opposite polarity, as many as the electric charges applied to the electrode 60 of the touch sensitive element, are applied to the entirety of the cover window 110, capacitances C1 and C2 are formed even between the touch electrodes 30 to which the voltage is not applied and the electrode 60 of the touch sensitive element. Therefore, in this comparative example, the capacitance changes even at a position corresponding to a touch electrode 30 to which the touch signal is not applied, thereby incorrectly determining a user input at a position where the touch input of the user does not occur. Accordingly, the position for the touch input of the user may not be detected accurately.

In comparison, as illustrated in FIG. 4B, each of the first electrodes 161 and the second electrodes 162 of the touch sensitive element 160 overlaps only with one touch electrode 130 in the display device 100. In this scenario, when the touch signal is applied only to the left touch electrode from among the plurality of touch electrodes 130 by the voltage source V during the touch sensing period, the electric charge having a polarity, such as the electric charge applied to the touch electrode 130, is applied only to the first electrode 161 positioned at the left side, and corresponding to the left touch electrode 130, from among the plurality of first electrodes 161, because both the first electrodes 161 and the second electrodes 162 of the touch sensitive element 160 are floating and the first electrode 161 and the second electrode 162 overlap only with the one touch electrode 130. Therefore, when the user applies the touch input to the cover window 110, the electric charges of opposite polarity, corresponds to the electric charges applied to the first electrode 161 of the touch sensitive element 160, are applied to the corresponding region of the cover window 110. Accordingly, capacitance C4 is generated between the left touch electrode 130, and capacitance C3 is generated between the touch sensitive element 160 and the cover window 110, thereby accurately detecting the touch position based on a change in the amount of the capacitance.

Figure 5A:
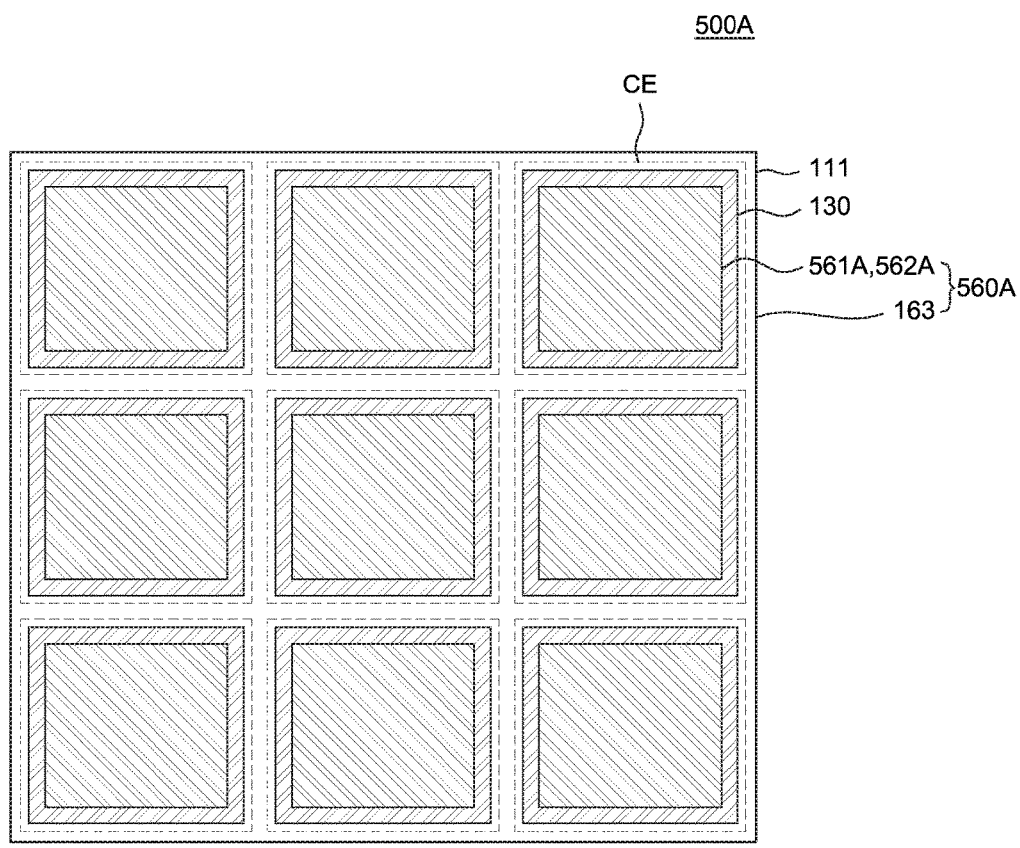
FIGS. 5A to 5C are schematic plan views illustrating an electrode layout structure of a display device according to various exemplary embodiments of the present disclosure.
Figure 5B:
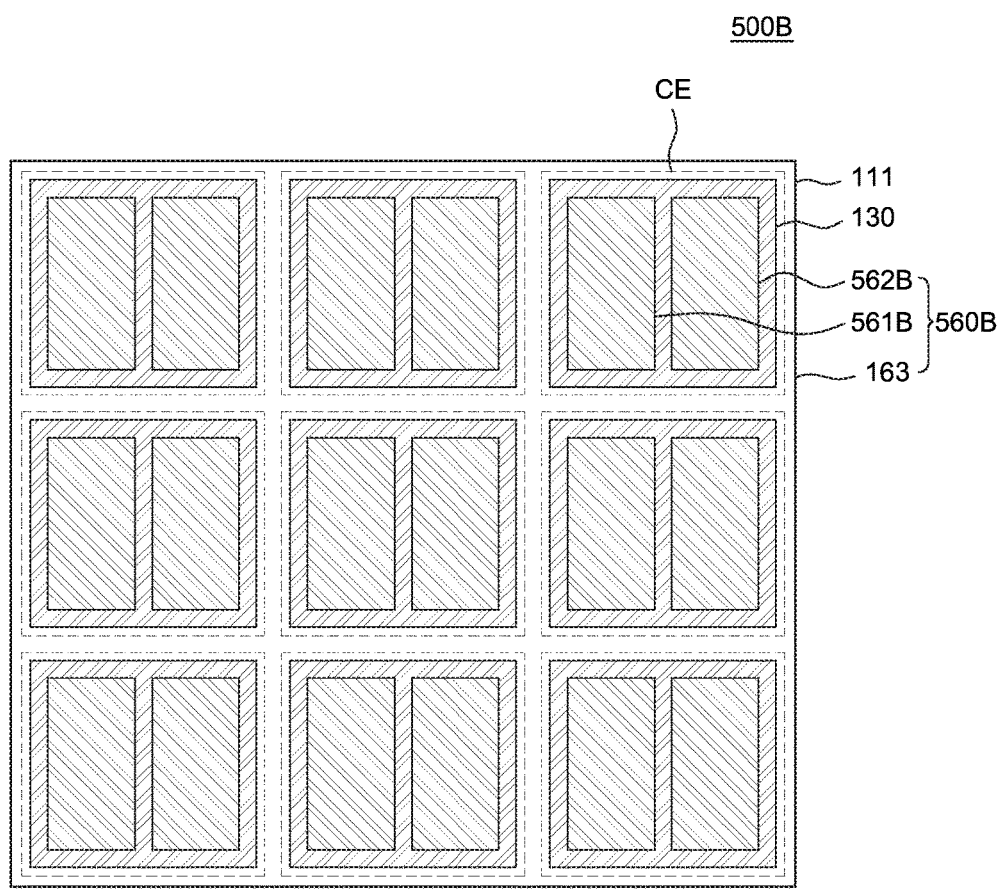
Figure 5C:
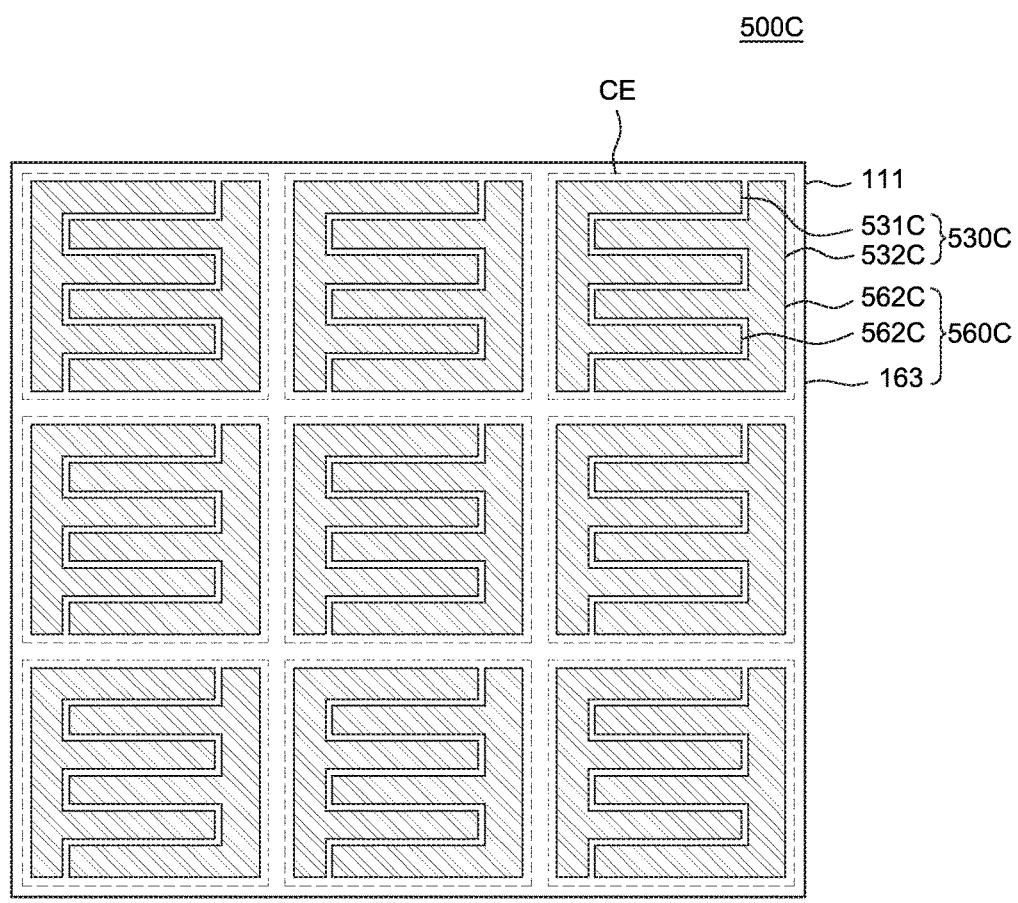

FIGS. 5A to 5C are schematic plan views illustrating an electrode layout structure of a display device according to various exemplary embodiments of the present disclosure. Display devices 500A, 500B, and 500C illustrated in FIGS. 5A to 5C, respectively, are different from the display device 100 described with reference to FIGS. 1 to 3 only in the shapes and layouts of the first electrodes 561A, 561B, and 561C and second electrodes 562A, 562B, and 562C of touch sensitive elements 560A, 560B, and 560C, respectively, and a touch electrode 430C. The display devices 500A, 500B, and 500C are substantially similar to the display device 100 in other components, and thus, redundant descriptions thereof will be omitted. In FIGS. 5A to 5C, only the touch sensitive elements 560A, 560B, and 560C, the touch electrodes 130 and 430C, and the first substrate 111 of the display device 100 are illustrated for ease of description in a state in which the touch sensitive elements 560A, 560B, and 560C, the touch electrodes 130 and 430C, and the first substrate 111 are viewed from the top of the touch sensitive elements 560A, 560B, and 560C. Therefore, a component disposed thereunder within the same area is represented only by a reference numeral.

As illustrated in FIG. 5A, the size of each of the plurality of electrodes 561A and 562A of the touch sensitive element 560A is smaller than the size of the corresponding touch electrode 130. That is, the first electrode 560A and the second electrode 562A of the touch sensitive element 560A disposed in one cell CE has a smaller size than the touch electrode 130 facing the first and second electrodes 561A and 562A of the one cell CE, and one surface of the first electrode 561A and a surface of the second electrode 562A facing the touch electrodes 130 have smaller areas than another surface of the touch electrode 130 facing the first electrode 561A and the second electrode 562A. Accordingly, even when the touch electrode 130 and each of the plurality of electrodes 561A and 562A overlap, a capacitance is not generated between the touch electrode 130 at an adjacent region. As a result, the touch input of the user may be more accurately detected. As illustrated in FIG. 5A, the first electrode 561A and the second electrode 562A have the same size, but the present disclosure is not limited thereto, and the first electrode 561A and the second electrode 562A may differ in size. Further, only one of the first electrode 561A and the second electrode 562A may be smaller than the corresponding touch electrode 130 and the other electrode and the touch electrode 130 may have similar sizes.

As illustrated in FIG. 5B, the plurality of electrodes 561B and 562B of the touch sensitive element 560B includes a plurality of first electrodes 561B and a plurality of second electrodes 562B disposed on the same surface of the electroactive layer 163. That is, the first electrode 561B and the second electrode 562B are disposed only on one surface of the electroactive layer 163 so as to be spaced apart from each other in one cell CE. Therefore, the respective touch electrode 130 overlaps both electrodes 561B and 562B of the touch sensitive element 560B. Further, the touch sensitive element 560B may generate the horizontal electric field between the first electrode 561B and the second electrode 562B, for example, by applying the first voltage to the first electrode 561B and grounding the second electrode 562B, thereby vibrating the electroactive layer 163 by applying the horizontal electric field thereto. In the display device 500B illustrated in FIG. 5B, the first electrode 561B and the second electrode 562B made of a transparent conductive material are disposed on one surface of the electroactive layer 163. Accordingly, the number of electrodes through which light is incident in the touch sensitive element 560B is reduced. Thus, transmittance of the touch sensitive element 560B may be improved because the light incident in the touch sensitive element 560B may pass through only one of the first electrode 561B and the second electrode 562B. Although, the electrodes of two touch sensitive elements 560B are illustrated in FIG. 5B as corresponding to one touch electrode 130, the present disclosure is not to limited thereto and the electrodes of three or more touch sensitive elements 560B may correspond to one touch electrode 130.

As illustrated in FIG. 5C, each of the plurality of touch electrodes 530C includes a first touch electrode 531C and a second touch electrode 532C disposed in one cell CE. The first and second touch electrodes 531C and 532C may be formed to have a comb shape with the combs disposed alternately. In this case, the first electrode 561C and the second electrode 562C of the touch sensitive element 560C may be formed to overlap with the first touch electrode 531C and the second touch electrode 532C, respectively, and to have the same size.

In the display devices 500A, 500B, and 500C according to various exemplary embodiments of the present disclosure, as illustrated in FIGS. 5A to 5C, respectively, when each of the plurality of electrodes 561A, 562A, 561B, 562B, 561C, and 562C of the touch sensitive elements 560A, 560B, and 560C overlaps only with one touch electrode among the plurality of touch electrodes 130 and 530C, there is no limit to the sizes, shapes, and layouts of the plurality of electrodes 561A, 562A, 561B, 562B, 561C, and 562C of the touch sensitive elements 560A, 560B, and 560C. Accordingly, the plurality of electrodes 561A, 562A, 561B, 562B, 561C, and 562C of the touch sensitive elements 560A, 560B, and 560C, respectively, may be arbitrarily designed within a range in which each of the plurality of electrodes 561A, 562A, 561B, 562B, 561C, and 562C overlaps only with one touch electrode among the plurality of touch electrodes 130 and 530C.

Figure 6A:
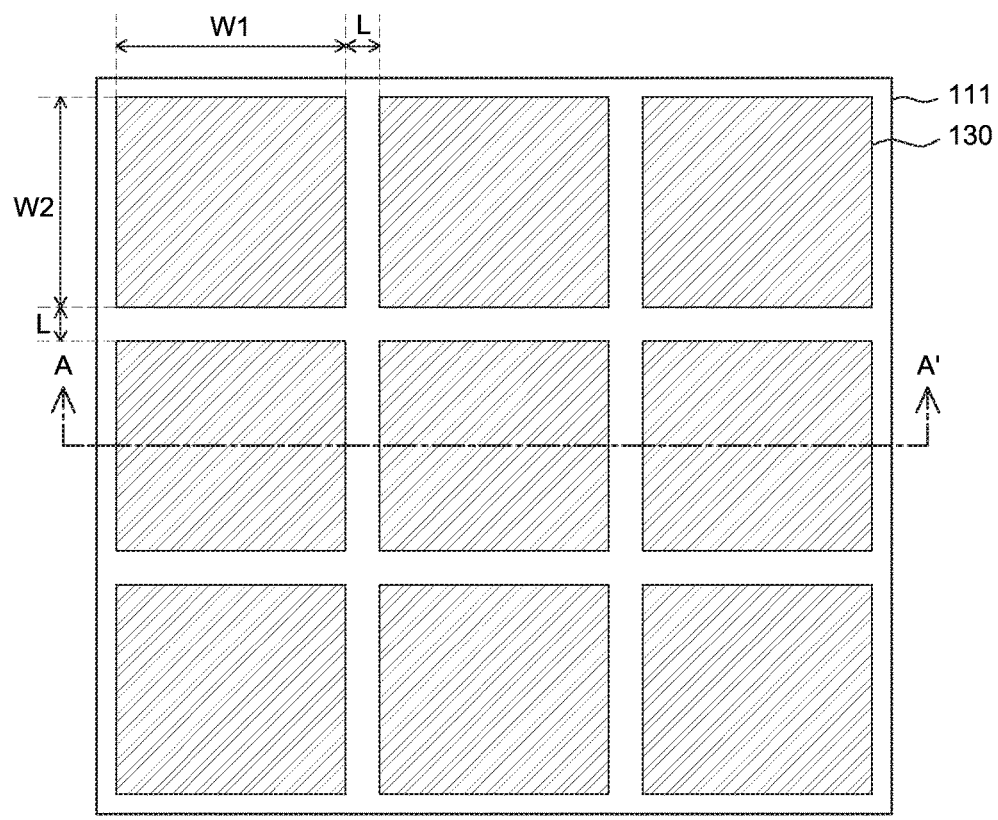
FIG. 6A is a schematic plan view illustrating the structure of a touch electrode applied to a display device according to a comparative example and a first exemplary embodiment of the present disclosure.
Figure 6B:
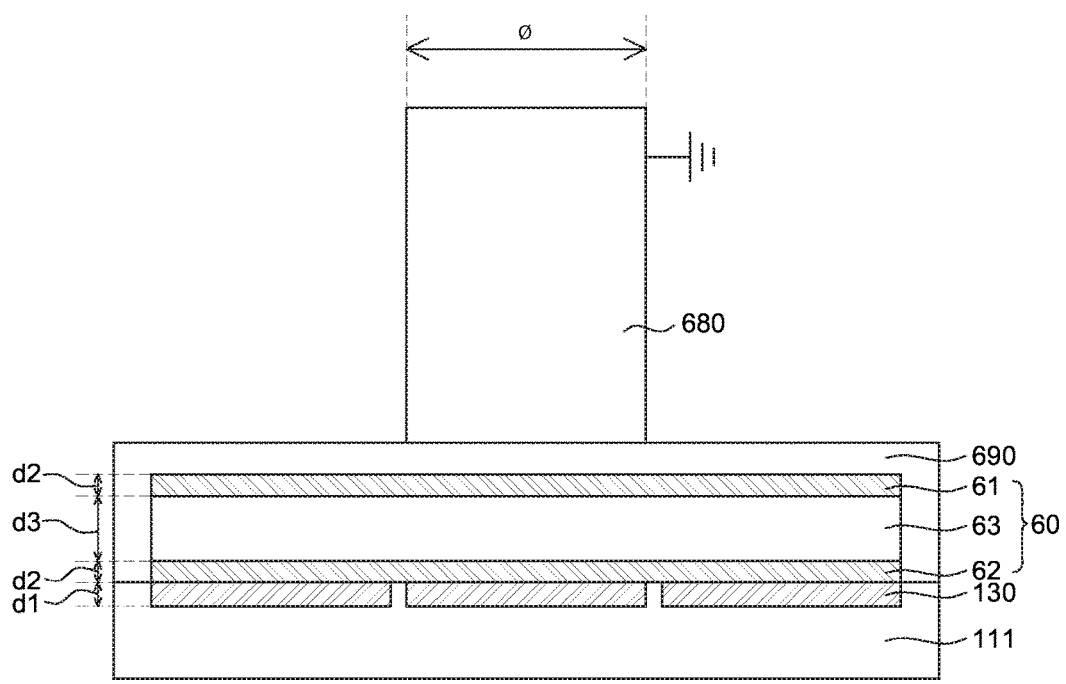
FIGS. 6B and 6C are schematic cross-sectional views illustrating a state for measuring touch misrecognition or not in the display device of the comparative example and the display device according to a first exemplary embodiment of the present disclosure.
Figure 6C:
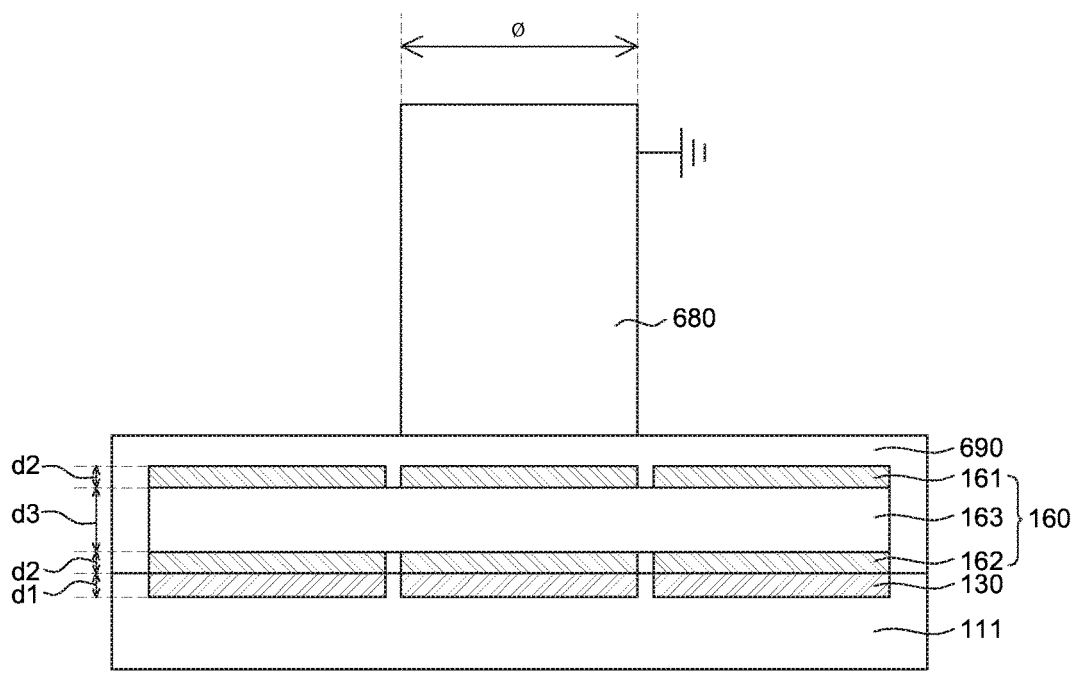

FIG. 6A is a schematic plan view of a touch electrode layout structure used in both the comparative example of FIG. 6B and the exemplary embodiment of FIG. 6C. FIGS. 6B and 6C are schematic cross-sectional views illustrating a state for measuring whether a touch was accurately recognized in the display device of the comparative example and the display device according to the exemplary embodiment of the present disclosure. FIGS. 6B and 6C are cross-sectional views along line A-A' of the device illustrated in FIG. 6A.

For ease of description, only the first substrate 111 and the touch electrode 130 disposed on the first substrate of the display panel 170 are illustrated in FIGS. 6A to 6C. A touch electrode 130 having a size of W1×W2 of 4 mm×4 mm disposed on the first substrate 111 is illustrated in FIG. 6A, and the touch electrodes 130 are disposed to be spaced apart from each other by a distance L of 50 μm. Further, the touch electrode 130 is made of indium tin oxide (ITO) and a thickness d1 of the touch electrode 130 is 500 Å.

FIG. 6B is a cross-section view along line A-A' of the display device illustrated in FIG. 6A for a case where the touch sensitive element 60 of the comparative example is disposed on the touch electrode 130 and the touch input is applied through a tip 680. As illustrated in FIG. 6B, the electroactive layer 63, the first electrode 61, and the second electrode 62 of the touch sensitive element 60 of the comparative example are disposed to overlap with all of the touch electrodes 130. The electroactive layer 63 of the comparative example is made of PVDF and has a thickness d3 of 80 μm. The first electrode 61 and the second electrode 62 of the comparative example are made of ITO and have a thickness d2 of 500 Å. A cellophane tape 690 having a thickness of 500 μm is used for fixing the touch sensitive element 60. The tip 680 used for applying the touch input is made of copper. The bottom surface of the tip 680 is flat and a diameter Ø of the bottom surface is 4 mm FIG. 6C is a cross-section view along line A-A' of the display device illustrated in FIG. 6A for a case where the touch input is applied to the display device 100 according to the exemplary embodiment of the present disclosureas illustrated in FIGS. 1 and 2, through the tip 680. As illustrated in FIG. 6B, the electroactive layer 163 of the touch sensitive element 160 overlaps with all of the touch electrodes 130, but each of the first electrodes 161 and the second electrodes 162 is disposed to overlap with only one touch electrode 130. The materials and the thicknesses d2 of the first electrodes 161 and the second electrodes 162, the material and the thickness d3 of the electroactive layer 163, the cellophane tape 690, and the tip 680 are the same as those of the comparative example illustrated in FIG. 6B.

FIGS. 7A and 7B are schematic views comparing and describing touch signal values measurement using the arrangements shown in FIGS. 6B and 6C. FIG. 7A illustrates the touch signal values corresponding to the region of the display panel 170 in a case where the touch input is applied in accordance with the comparative example illustrated in FIG. 6B, and FIG. 7B illustrates the touch signal values corresponding to the region of the display panel 170 in a case where the touch input is applied according to the exemplary embodiment illustrated in FIG. 6C. Each of the rectangular cells in FIGS. 7A and 7B indicates a touch coordinate and a figure in a rectangle is acquired by converting the value of the capacitance change in each touch coordinate into a digital data value, i.e., the larger the figure in the rectangle, the larger is the capacitance change amount at the corresponding position.

Referring to FIGS. 6B and 7A, the first electrode 61 and the second electrode 62 of the touch sensitive element 60 are disposed to overlap with all of the plurality of touch electrodes 130 in the comparative example. Accordingly, the touch input is applied only to a center region, but the capacitance change amount at the peripheral region also increases. Therefore, a touch may be detected in a peripheral part where a user touch input did not occur.

Referring to FIGS. 6C and 7B, each of the first electrodes 161 and the second electrodes 162 of the touch sensitive element 160 overlaps only with one touch electrode 130. Therefore, only the center region which is actually touched exhibits a large capacitance change amount and the peripheral regions exhibit a small capacitance change amount. Accordingly, only the region actually touched by the user is accurately detected as a touch input position.

Figure 8:
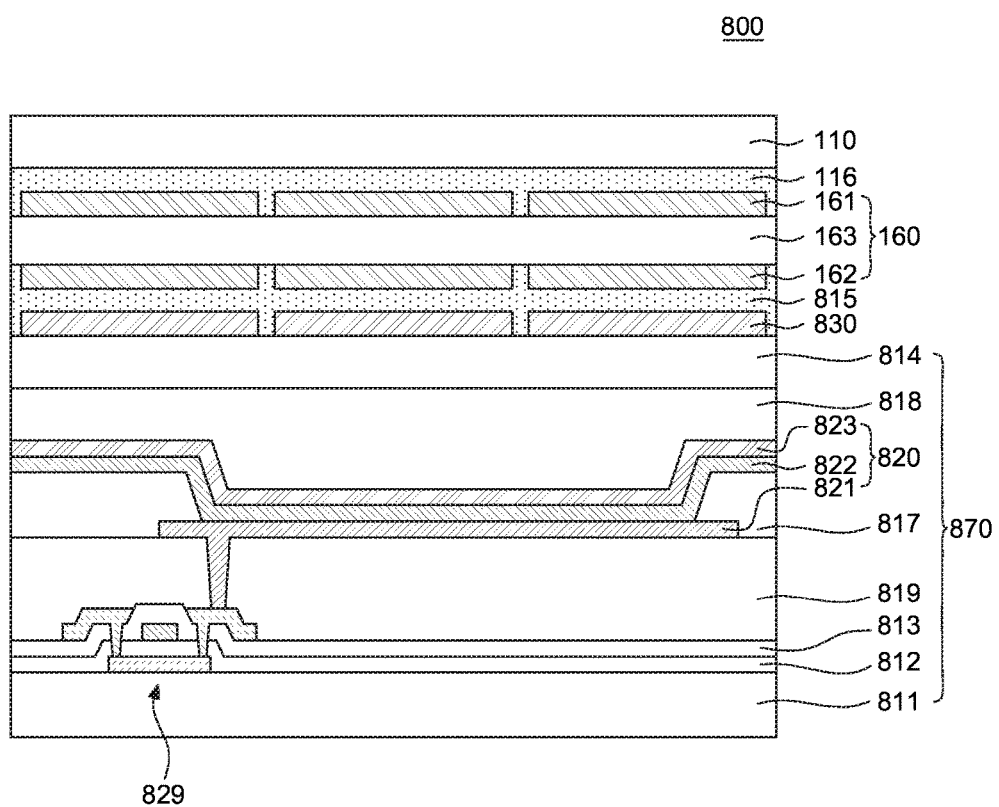
FIG. 8 is a schematic cross-sectional view of a display device according to a second exemplary embodiment of the present disclosure.

FIG. 8 is a schematic cross-sectional view illustrating a display device according to a second exemplary embodiment of the present disclosure. As illustrated in FIG. 8, the display device 800 includes a display panel 870, a touch sensor, and the touch sensitive element 160. The display device 800 illustrated in FIG. 8 differs from the display device 100 described with reference to FIGS. 1 to 3 only in that the display panel 870 is an organic light emitting display panel and the touch sensor is an on-cell type touch sensor, and the driving method of the display device 100 and the display device 800 also differs. All other components of the display device 800 illustrated in FIG. 8 is substantially similar to the display device 100 illustrated in FIGS. 1 to 3, and thus, redundant descriptions thereof are omitted.

As illustrated in FIG. 8, the display panel 870 is a top emission type organic light emitting display panel in which light emitted by the organic light emitting element 820 is discharged through a second substrate 814 opposite to a first substrate 811 on which a thin film transistor 829 is disposed. The display panel 870 further includes a first insulating layer 812, a second insulating layer 813, an overcoating layer 819, a bank 817, and an encapsulation part 818.

The first substrate 811 supports various components of the display panel 870, and may be made of a flexible glass or plastic.

The thin film transistor 829 is disposed on the first substrate 811. In the thin film transistor, an active layer is disposed on the first substrate 811 and the first insulating layer 812 for insulating the active layer and a gate electrode is disposed on the active layer. The second insulating layer is disposed on the first insulating layer 812 and the gate electrode and covers the gate electrode. A source electrode and a drain electrode are disposed on the second insulating layer 813 and are electrically connected with the active layer. For ease of description, only a driving thin film transistor is included in the display device 800 as illustrated in FIG. 8, but the present disclosure is not limited thereto, and a switching thin film transistor, a capacitor, and the like may also be included in the display device 800. Further, the thin film transistor 829 is illustrated in FIG. 8 as having a coplanar structure, but the present disclosure is not limited thereto, and a thin film transistor having a staggered structure may also be used.

The overcoating layer 819 is formed on the thin film transistor 829, and this layer planarizes the top of the thin film transistor 829. The overocating layer 819 may be made of the organic insulating material, for example, an acrylic-based resin.

The organic light emitting element 820 is disposed on the overcoating layer 819, and includes an anode 821, an organic layer 822, and a cathode 823. The anode 821 is disposed on the overcoating layer 819 and electrically connected with one of the source electrode and the drain electrode of the thin film transistor 829 through a contact hole of the overcoating layer 819. The anode 821 may include a transparent conductive layer made of a transparent conductive material and a reflection layer made of a metallic material having excellent reflectivity under the transparent conductive layer, because the display panel 870 is the top emission type organic light emitting display panel. However, a lamination structure of the anode 821 is not limited thereto. The bank 817 is disposed to cover both ends of the anode 821. The region of the anode 821 not covered by the bank 817 may be defined as the emission region. The organic layer 822 is disposed on the anode 821 and the bank 817. The organic layer 822 may have, for example, a structure in which a hole injection layer (HIL), a hole transport layer (HTL), an organic emission layer (EML), an electron transport layer (ETL), and an electronic injection layer (EIL) are sequentially laminated. Further, the organic layer 822 may have a structure in which a plurality of light emitting units each including the organic emission layer (EML) is laminated. In addition, the organic emission layer 822 is illustrated in FIG. 8 as being formed on both the anode 821 and the bank 817. However, the organic layer 822 may be formed only on the anode 821 exposed by the bank 817. The cathode 823 is disposed on the organic layer 822. The cathode 823 may be made of a metallic material having a very small thickness or a transparent conductive material, because the display panel 870 is the top emission type organic light emitting display panel, but is not limited thereto.

The second substrate 814 is disposed on the organic light emitting element 820 and the encapsulation part 818 is disposed between the organic light emitting element 820 and the second substrate 814. The second substrate 814 may be disposed to face the first substrate 811 and be made of a flexible glass or plastic. The encapsulation part 818 protects the organic light emitting element 820 from moisture or oxygen penetration, may be an inorganic layer or have a structure in which the inorganic layer and the organic layer 822 are alternately laminated. Alternatively, the encapsulation part 818 may be made of a face seal material.

The touch sensor integrated with the display panel 870 is an on-cell type touch sensor. That is, the touch sensor is formed above the display panel 870. For example, as illustrated in FIG. 8, the touch electrode 830 of the touch sensor is disposed on the top surface of the second substrate 814 which is an upper substrate of the display panel 870. The touch electrode 830 may be formed on the top surface of the second substrate 814 by sputtering, and the like, using a transparent conductive material.

As further illustrated in FIG. 8, the touch sensitive element 160 is disposed on the display panel 870 and the touch sensor, and the cover window 110 is disposed on the touch sensitive element 160. The touch sensitive element 160 is bonded with the second substrate 814 through a first bonding layer 815 and bonded with the cover window 110 through a second bonding layer 116.

Similar to the display device 100 according to the first exemplary embodiment of the present disclosure, the display device 800 according to the second exemplary embodiment of the present disclosure also includes each of the plurality of electrodes 161 and 162 of the touch sensitive element 160 overlapping with only with one touch electrode 830 from among the plurality of touch electrodes 830. Accordingly, it is possible to suppress the overlap of the first electrodes 161 and the second electrodes 162 with the plurality of touch electrodes 830, thereby avoiding misrecognition of a touch input.

The touch electrode 830 is not disposed in the display panel 870, because the display device 800 includes an on-cell type touch sensor. That is, the touch electrode 830 does not operate as the anode 821 or the cathode 823 of the organic light emitting element 820. Therefore, the image display period and the touch sensing period may be simultaneously performed at the time of driving the display device 800. However, as in the display device 100, the touch sensitive element 160 of the display device 800 needs to be time-division driven into the touch sensing period and the touch sensitive element driving period. That is, when the touch sensitive element 160 is driven into the touch sensing period, the touch sensor may not normally detect the touch input because the touch signal is applied to the touch electrode 830 for touch detection through the touch electrode 830 during the touch sensing period. Therefore, during the touch sensing period, the plurality of electrodes of the touch sensitive element 160 are floating so that the touch sensor may accurately detect the touch input of the user.

During the touch sensitive element driving period, the touch sensor is not driven and the touch sensitive element driving signal is applied to the touch sensitive element 160 to drive the touch sensitive element 160. For example, during the touch sensitive element driving period, an AC voltage or pulse voltage is applied to the first electrode 161 of the touch sensitive element 160 and the second electrode 162 of the touch sensitive element 160 is grounded to vibrate the electroactive layer 163.

In some exemplary embodiments, the display panel 870 may be a bottom emission type organic light emitting display panel. In such a case, the touch electrode 830 may be disposed on the bottom surface of the first substrate 811 and the touch sensitive element 160 may be disposed under the touch electrode 830.

Although the exemplary embodiments of the present disclosure have been described in detail with reference to the accompanying drawings, the present disclosure is not limited thereto and may be embodied in many different forms without departing from the technical concept of the present disclosure. The exemplary embodiments of the present disclosure are provided for illustrative purposes only but not intended to limit the technical concept of the present disclosure. The protective scope of the present disclosure should be construed based on any appended claims and combinations thereof, and all technical concepts in the equivalent scope thereof should be construed as falling within the scope of the present disclosure.

What is claimed is:

1. A display device comprising:
   a touch sensitive element comprising a plurality of cells, each of the plurality of cells having an electroactive layer, a plurality of first electrodes disposed on a first surface of the electroactive layer and spaced apart from each other, and a plurality of second electrodes disposed on a second surface of the electroactive layer opposite to the first surface and spaced apart from each other;
   a display panel disposed under the touch sensitive element; and
   a touch sensor integrated in the display panel and having a plurality of touch electrodes spaced apart from each other,
   wherein a pair of the first and second electrodes of the touch sensitive element in each of the plurality of cells overlaps with only one touch electrode of the plurality of touch electrodes, and
   wherein the pair of the first and second electrodes of the touch sensitive element have a comb shape with the combs disposed alternately, and overlap the corresponding touch electrode of the plurality of the touch electrodes having a same shape.

2. The display device according to claim 1, wherein an area of each of the plurality of electrodes of the touch sensitive element is equal to or smaller than an area of the corresponding one touch electrode of the plurality of touch electrodes.

3. The display device according to claim 1, wherein each of the plurality of cells include a driving circuit implemented by an active matrix method.

4. The display device according to claim 1, wherein the plurality of touch electrodes are a plurality of common electrodes driving the display panel.

5. The display device according to claim 4, wherein the display device is time-division driven into an image display period and a touch sensing period, and during the image display period, a common voltage is applied to the plurality of touch electrodes and a driving voltage is applied to the plurality of electrodes of the touch sensitive element, and during the touch sensing period, the plurality of electrodes of the touch sensitive element are floating.

6. The display device according to claim 1, wherein the touch sensor is an on-cell type touch sensor in which the plurality of touch electrodes is disposed on a top surface of the display panel.

7. The display device according to claim 6, wherein the display device is time-division driven into a touch sensing period and a touch sensitive element driving period, and the plurality of electrodes of the touch sensitive element are floating during the touch sensing period.

8. The display device according to claim 1, wherein the electroactive layer comprises an electroactive polymer, and the plurality of electrodes of the touch sensitive element comprises a transparent conductive material.

9. A display device comprising:

a display panel;

a touch sensor having a plurality of touch electrodes disposed in the display panel, and wherein the plurality of touch electrodes are spaced apart from each other; and a touch sensitive element comprising a plurality of cells disposed on the display panel and the touch sensor, wherein each of the plurality of cells of the touch sensitive element includes:

an electroactive layer, and a plurality of first electrodes disposed on a first surface of the electroactive layer and spaced apart from each other, and a plurality of second electrodes disposed on a second surface of the electroactive layer opposite to the first surface and spaced apart from each other, and wherein a pair of the first and second electrodes in each of the plurality of cells corresponds with one touch electrode among the plurality of touch electrodes, and wherein the pair of the first and second electrodes of the touch sensitive element have a comb shape with the combs disposed alternately, and overlap the corresponding touch electrode of the plurality of the touch electrodes having a same shape.

10. The display device according to claim 9, wherein the display panel is a liquid crystal display panel, and the plurality of touch electrodes are common electrodes of the liquid crystal display panel.

11. The display device according to claim 9, wherein the display panel is an organic light emitting display panel, and the plurality of touch electrodes is disposed on a top surface of an upper substrate of the organic light emitting display panel.

12. The display device according to claim 9, wherein an area of each of the plurality of electrodes of the touch sensitive element is equal to or smaller than an area of the corresponding one touch electrode of the plurality of touch electrodes.

13. A method of driving a display device, the method comprising:

applying a common voltage to a plurality of common electrodes of a display panel spaced apart from each other in which a touch panel is integrated and applying a driving voltage to a touch sensing element comprising a plurality of cells, each of the plurality of cells having a plurality of first electrodes disposed on a first surface of an electroactive layer of a touch sensitive element positioned on the display panel and spaced apart from each other, and a plurality of second electrodes disposed on a second surface of the electroactive layer and spaced apart from each other, during an image display period; and applying a touch signal to the plurality of common electrodes and floating the plurality of first and second electrodes of the touch sensitive element, during a touch sensing period, wherein a pair of the first and second electrodes of the touch sensitive element in each of the plurality of cells overlaps with only one common electrode of the plurality of common electrodes, and wherein the pair of the first and second electrodes of the touch sensitive element have a comb shape with the combs disposed alternately, and overlap the corresponding touch electrode of the plurality of the touch electrodes having a same shape.

* * * * *